UNITED STATES PATENT OFFICE.

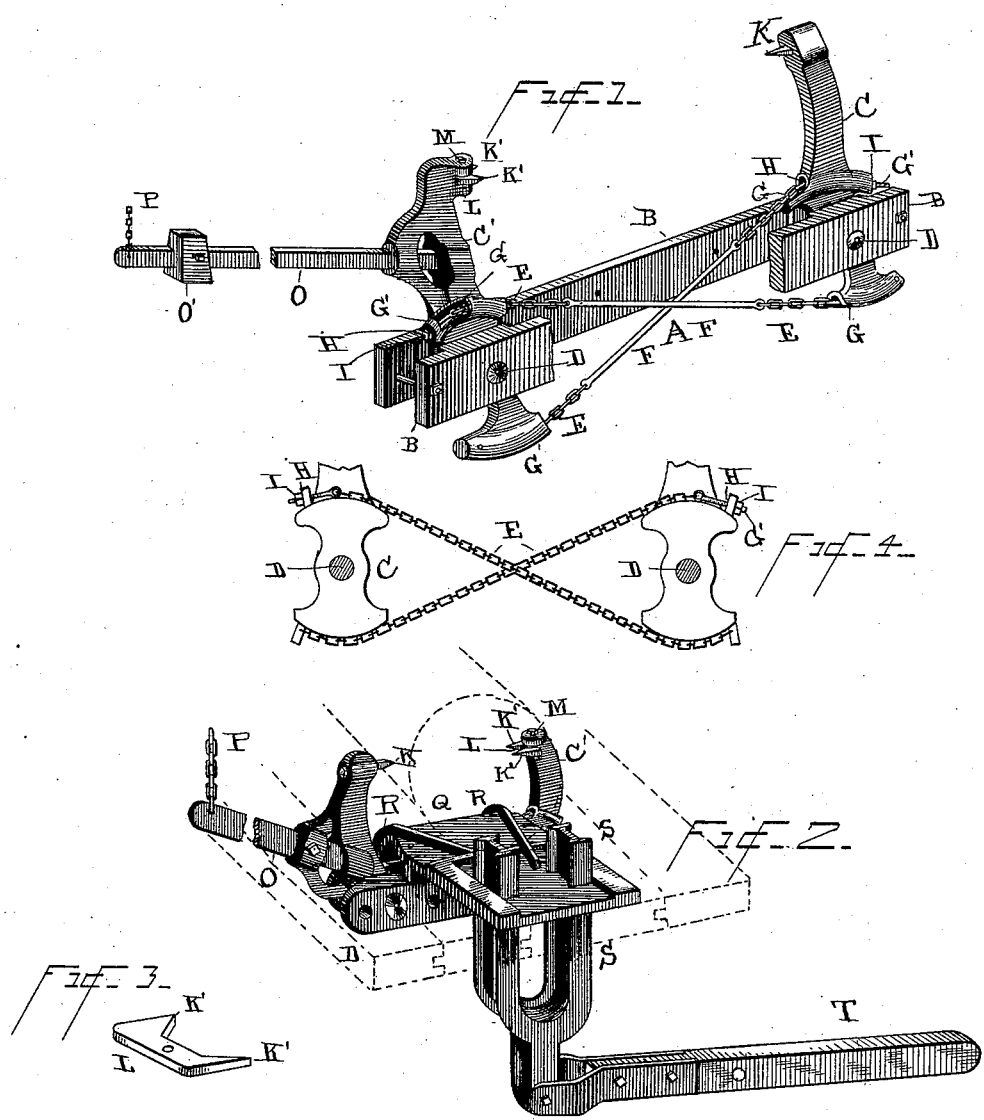

WILLIS J. PERKINS, OF GRAND RAPIDS, MICHIGAN.

LOG-DOGGING APPARATUS.

SPECIFICATION forming part of Letters Patent No. 414,994, dated November 12, 1889.

Application filed November 30, 1888. Serial No. 292,202. (No model.)

*To all whom it may concern:*

Be it known that I, WILLIS J. PERKINS, residing at Grand Rapids, in the county of Kent and State of Michigan, have invented certain new and useful Improvements in Log-Dogging Apparatus, of which the following is a specification, reference being had therein to the accompanying drawings.

This invention relates to log-dogs, especially to log-holding dogs designed to hold a log while sawing into short lengths or bolts by a crosscut or drag saw.

The object of the invention is to construct a dog which will operate to hold the log against rolling and sliding, and also against movement out of line.

The invention consists in the construction and combination of parts, as hereianfter stated.

In the drawings, Figure 1 is a perspective view of a pair of the improved dogs, part of the frame being broken away. Fig. 2 is a perspective of a pair of dogs in their relation to the log plate and stop. Fig. 3 is a perspective of the pivoted holding-tooth. Fig. 4 is a diagram showing the connections from one pivoted dog to the other.

In Fig. 1, A indicates the framing which supports the dogs. This frame consists of paneled bars or beams B B, between which the dogs C C' are supported on pivoted bolts D. The dogs C C' are connected by chains E E and rods F F, or equivalent mechanism, such as continuous chains. Each chain E connects one dog from a point above its pivot to the opposite dog at a point below its pivot. The dogs have bearing-surfaces G G, on which the chains bear. These bearing-surfaces are concentric with the pivotal pins or bolts D. One chain is fastened at the outer upper side of the bearing-surface G of the right-hand dog, where it is attached to a bolt G'. This bolt passes through a hole H in the dog and has a set-nut I outside on its outer screw-threaded end. The other chain E extends in reverse direction and engages the bearing-surfaces of the dogs in complementary positions to those last described. It follows from this mode of connection that when one dog is rocked on its pivot D the other must have a corresponding movement, but as the connections E F are crossed the toothed ends of the dogs will swing either toward each other or away from each other. This will cause them to clamp or release a log placed between them. The adjustment of the set-nut I can be made to take up wear or to cause the dogs to open at different initial points, so as to hold logs of different sizes with the lever in the most convenient position for the operator. One of the dogs, as C, may have a single tooth K. The other dog C' will have a plate L, borne on a pivot M, which plate has teeth K' K', one at each side of said pivot. This permits the teeth on plate L to adjust themselves to the surface and direction of the log and insures a firm grasp. One of the dogs is provided with a lever O, extending out from sockets in the dog or connected in other convenient manner. This lever O supports a weight O' and may be drawn upward by a chain or other connection P, leading to a suitable power mechanism. An upward pull on chain P will move the dog-teeth toward each other, biting a log between them. The release of this chain P permits the weight O' to throw the dog-teeth out from the log. As the connections E from dog to dog bear on concentric surfaces, it follows that the movement of the dog-teeth at equal distances from their respective centers of movement will be uniform, and the dogs will thus force the log to a central position between them.

In Fig. 2 I have illustrated the bed-plate Q for the logs, having converging ribs R R on its surface, and a stop S, against which the end of the log bears. The converging ribs tend to center the log as it is forced toward the stop. The stop S is vertically adjustable by means of treadle-lever T, which is in position to be reached by the foot of the operator and lifted up in front of the end of the log or permitted to drop down out of the way.

It is apparent that differences in construction involving the substitution of equivalents will not depart from the spirit of my invention.

The framing A or bed-plate Q may be in the floor of the mill or opposite a car or logway. The cross-cutting can be done by any kind of a dog-saw or by a hand crosscut-saw.

What I claim is—

1. In a log-dogging machine, the combination of two pivoted dogs, a connection from one side of the pivot of one dog to the opposite side of the pivot of the other dog, whereby the dog-teeth are caused to approach or recede from each other when one dog is turned on its pivot, and a plate pivoted to one of the dogs having teeth at each side of the pivot, whereby the teeth adjust themselves to the log and the log is held at three points, substantially as described.

2. The combination, in a log-dogging apparatus, of a pair of dogs pivoted opposite to and having teeth facing each other, curved bearing-surfaces on said dogs, and flexible connections from the bearings on each dog to the bearing on the opposite side of the pivot of the other dog, substantially as described.

3. In a log-dogging device, a pair of pivoted dogs having teeth facing each other, and an adjustable connection from one dog to the other, said connection secured to one dog at one side of its pivot and to the other dog at the opposite side of its pivot, substantially as described.

4. In a log-dogging apparatus, a pair of pivoted dogs having teeth facing each other, said dogs having curved bearing-surfaces thereon, a pair of flexible connections running over the bearing-surfaces and connecting the dogs from opposite sides of their pivots, said connections crossing each other, as described, and a tightener on said flexible connections, substantially as described.

5. In a log-dogging apparatus, the two pivoted dogs having teeth facing each other, the curved bearing-surfaces on the dogs, a chain passing over the curved bearing on each dog and connected to a corresponding chain passing over the curved surface of the opposite dog at the opposite side of the pivot thereof, and a screw and nut for tightening each chain-connection, the parts being combined and arranged substantially as described.

6. The combination, with a log-dog, of a plate pivoted thereto and having teeth at each side of the central plane of the dog, whereby the teeth adjust themselves to the log, substantially as described.

7. In a log-dogging device, the combination of a dog having a single tooth, and a dog opposite the same having a plate pivoted therein with a tooth at each side of the central plane of the dog, whereby the teeth engage the log at three points, substantially as described.

8. The combination, in a dogging device, of the log-table having converging ribs, and the stop near the converging end of said ribs, with the log-holding dogs near said table, substantially as described.

9. In a log-dogging device, the combination of the holding-dogs pivoted opposite each other and connected by flexible connections, so as to move uniformly toward and away from the common center, the table with ribs converging toward a plane passing through the same center, and the adjustable stop opposite, at the converging end of the ribs, substantially as described.

In testimony whereof I affix my signature in presence of two witnesses.

WILLIS J. PERKINS.

Witnesses:
ARTHUR C. DENISON,
HUGH E. WILSON.